(12) United States Patent
Lanham

(10) Patent No.: US 10,213,867 B2
(45) Date of Patent: Feb. 26, 2019

(54) TIP DRESSER BLADE

(71) Applicant: Semtorq, Inc., Twinsburg, OH (US)

(72) Inventor: Greg Lanham, Twinsburg, OH (US)

(73) Assignee: Semtorq, Inc., Twinsburg, OH (US)

( * ) Notice: Subject to any disclaimer, the term of this patent is extended or adjusted under 35 U.S.C. 154(b) by 0 days.

(21) Appl. No.: 15/728,896

(22) Filed: Oct. 10, 2017

(65) Prior Publication Data

US 2018/0236592 A1 Aug. 23, 2018

Related U.S. Application Data

(60) Provisional application No. 62/462,603, filed on Feb. 23, 2017.

(51) Int. Cl.
*B23K 11/30* (2006.01)
*B23C 5/02* (2006.01)

(52) U.S. Cl.
CPC ............ *B23K 11/3063* (2013.01); *B23C 5/02* (2013.01); *B23C 2228/24* (2013.01)

(58) Field of Classification Search
CPC ....... B23K 11/3063; B23K 11/36; B23C 5/02; B23C 3/12; B23B 5/166; Y10T 409/304256
See application file for complete search history.

(56) References Cited

U.S. PATENT DOCUMENTS

| | | | | |
|---|---|---|---|---|
| 4,762,446 A | * | 8/1988 | Nishiwaki | B23B 5/166 144/30 |
| 4,966,504 A | * | 10/1990 | Seme, Jr. | B23B 5/166 30/375 |
| 4,966,506 A | * | 10/1990 | Slanker | B23B 5/166 219/119 |
| 5,332,342 A | * | 7/1994 | Kizaki | B23B 5/166 219/119 |
| 7,789,600 B2 | * | 9/2010 | Goto | B23K 11/3063 407/42 |
| 8,833,749 B2 | * | 9/2014 | Park | B23B 5/166 269/143 |
| 8,851,811 B2 | * | 10/2014 | Sigler | B23B 5/00 409/138 |
| 8,920,218 B2 | * | 12/2014 | Moision | B23K 35/40 451/443 |
| 9,346,118 B2 | * | 5/2016 | Sigler | B23B 5/166 |
| 2005/0211677 A1 | * | 9/2005 | Chen | B23K 11/115 219/117.1 |
| 2015/0053654 A1 | | 2/2015 | Sigler et al. | |
| 2017/0225263 A1 | * | 8/2017 | Sigler | B23K 11/20 |
| 2018/0236593 A1 | * | 8/2018 | Lanham | B23K 11/3063 |

FOREIGN PATENT DOCUMENTS

| | | |
|---|---|---|
| EP | 233 2685 | 6/2011 |
| EP | 302 5817 | 7/2016 |
| WO | 2007 015 399 | 2/2007 |

OTHER PUBLICATIONS

IL Patent Office, International Search Report and Written Opinion, PCT/US2017/062584, dated Mar. 6, 2018.

* cited by examiner

*Primary Examiner* — Will Fridie, Jr.
(74) *Attorney, Agent, or Firm* — Emerson Thomson Bennett, LLC; Daniel A. Thomson

(57) ABSTRACT

Provided is a tip dresser blade blank comprising a casting of M-2 steel hardened to a Rockwell C hardness in the range of 63 to 66, inclusive, by double tempering. The casting may be ground to provide a specific first geometry or a specific second geometry.

17 Claims, 6 Drawing Sheets

SECTION A-A

SECTION A-A

TIP DRESSER BLADE

CROSS-REFERENCE TO RELATED APPLICATIONS

This application claims the benefit of U.S. Provisional Application No. 62/462,603, filed Feb. 23, 2017, the entirety of which is fully incorporated by reference herein.

I. BACKGROUND

The present subject matter is tip dressing of spot welder tips. More specifically, the present technology is directed to the material and geometry of a tip dresser blade.

Spot welding typically uses pairs of shaped electrodes to concentrate the applied welding current in a spot clamped therebetween. Welding heat results from the resistance to the applied welding current. Welding electrodes are typically made from a material having low electrical resistance such as copper or copper alloy. The size and shape of the electrode depends on the application. Weld quality in a particular application can depend greatly on the size and shape and material of the electrode.

With each weld, the electrodes change slightly in shape, size, and surface material from heat, pressure, and accumulation of corrosion or debris built up thereon. These changes in the electrodes can degrade the quality of subsequent welds. In order to maintain the desired weld quality and extend electrode service life, after a certain number of welds, it is common to perform a tip dressing operation, also known as "tip dress", on the electrodes in order to clean off buildup or corrosion, reshape the electrode tip or otherwise restore the electrode to the desired size, shape, material or combination thereof. Typically, a tip dress comprises a milling operation directed to milling the face of the electrode with a cutting blade known as a tip dresser blade. The tip dress typically involves operationally engaging the electrode and the tip dresser blade and cutting away material from the electrode by rotating the tip dresser blade relative to the electrode for a certain time.

There are multiple technical challenges present in tip dressing technology. The time that it takes for a tip dress is time the tip being dressed is not available for welding, also known as "down time", so it is desirable to reduce or minimize the time needed to produce the desired tip dress. Also, the tip dresser device itself requires maintenance: the tip dress blade typically requires replacing or sharpening at some service interval. The time that it takes to perform maintenance on the tip dresser device, such as replacement or sharpening of the tip dress blade, can also result in down time, so it is desirable to reduce or minimize tip dresser device maintenance time.

It remains desirable to provide tip dress blades that can perform tip dress operations more quickly than conventional tip dress blades. It remains desirable to provide tip dress blades that remain serviceable for longer times than conventional tip dress blades.

II. SUMMARY

In accordance with one aspect of the present subject matter provided is a tip dresser blade blank comprising a body formed of M-2 steel hardened to a Rockwell C hardness in the range of 63 to 66, inclusive, by double tempering. The body may be ground to provide a specific first geometry or a specific second geometry.

Still other benefits and advantages of the present subject matter will become apparent to those skilled in the art to which it pertains upon a reading and understanding of the following detailed specification.

III. BRIEF DESCRIPTION OF THE DRAWINGS

The present subject matter may take physical form in certain parts and arrangement of parts, embodiments of which will be described in detail in this specification and illustrated in the accompanying drawings which form a part hereof and wherein.

IV. DETAILED DESCRIPTION

Figure 1:
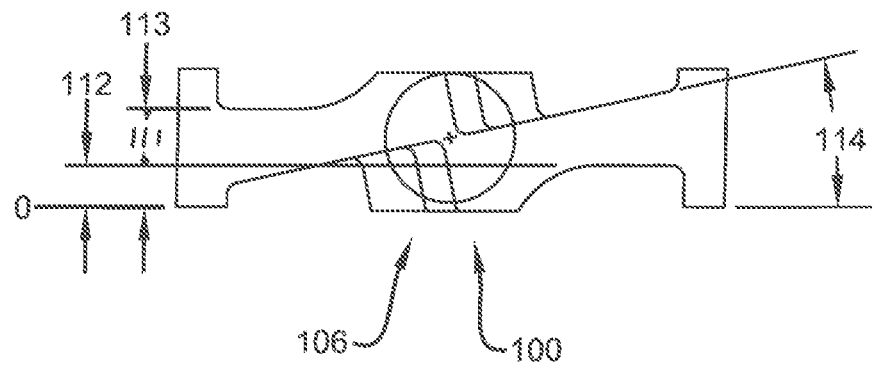
FIG. 1 is a top view of one embodiment of a tip dresser blade blank.

Referring now to the drawings wherein the showings are for purposes of illustrating embodiments of the present subject matter only and not for purposes of limiting the same, and wherein like reference numerals are understood to refer to like components, provided is a tip dresser blade blank.

In a certain embodiments, a tip dresser blade blank 106, 108 may comprise a tempered and ground body 100. In certain embodiments, the body 100 may be a formed by casting, forging, machining, or other operations chosen with good engineering judgment. In certain embodiments, the body 100 may be formed of steel. In certain embodiments, the body 100 may be formed of tool steel. In certain embodiments, the body 100 may be formed of high-speed steel. In certain embodiments, the body 100 may be formed of tungsten steel, molybdenum high speed steel, or cobalt high speed steel. In certain embodiments, the body 100 may be an M1, M2, M7, M35, M42, or M50 molybdenum high speed steel. It should be understood that the selection of alloy is governed by a multitude of factors including wear resistance, sensitivity to decarburization, and cost.

The body 100 may be tempered once, twice, or more times. In some embodiments the body 100 is tempered to harden it to a Rockwell C hardness in the range of 63 to 66, inclusive. In some embodiments the body 100 is double tempered to harden it to a Rockwell C hardness in the range of 63 to 66, inclusive. In other embodiments, the body 100 may have a hardness less than Rockwell C 63, such as in the range of less than 63 and down to 50 Rockwell C, or greater than Rockwell C 66, such as in the range of more than 66 and up to 80 Rockwell C. A body 100 with a hardness of less than Rockwell C 63 may reduce cost or provide impact resistance. A body 100 with a hardness of greater than Rockwell C 66 may provide increased abrasion resistance and service life. A body 100 having a Rockwell C hardness in the range of 63 to 66, inclusive, may provide a desirable compromise between the qualities of a harder and softer casting. A body 100 of M2 steel can be hardened to a Rockwell C hardness in the range of 63 to 66, inclusive, by double tempering, providing high wear resistance, acceptable decarburization sensitivity, high bending strength, and high toughness.

The body 100 may be ground to provide the desired geometry.

Figure 2:
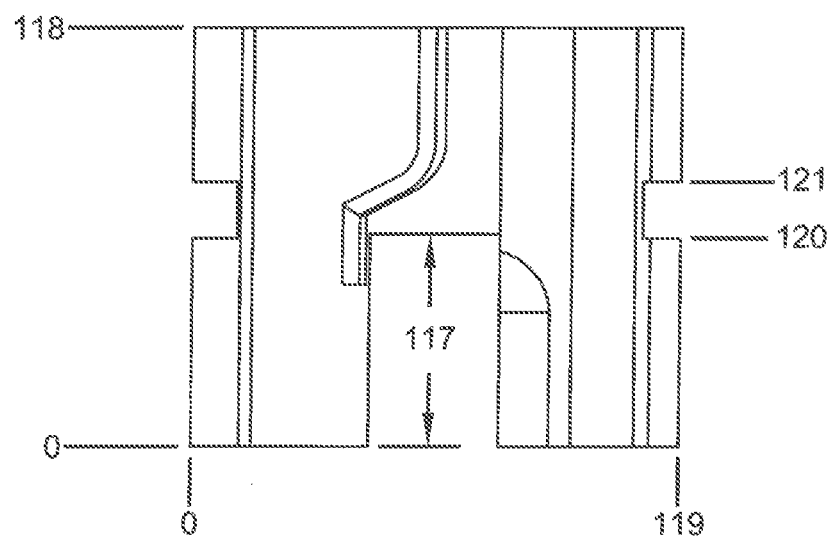
FIG. 2 is a front view of the embodiment of FIG. 1 of a tip dresser blade blank.
Figure 3:
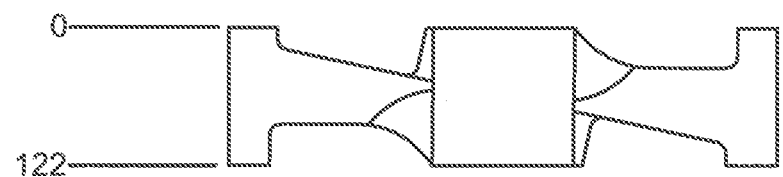
FIG. 3 is a bottom view of the embodiment of FIG. 1 of a tip dresser blade blank.
Figure 4:
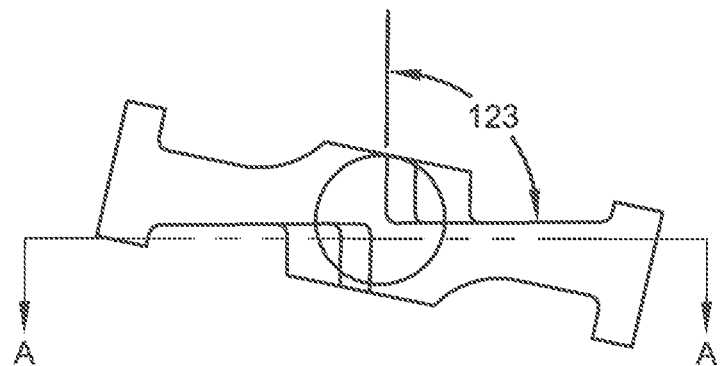
FIG. 4 is a top view of the embodiment of FIG. 1 of a tip dresser blade blank.
Figure 5:
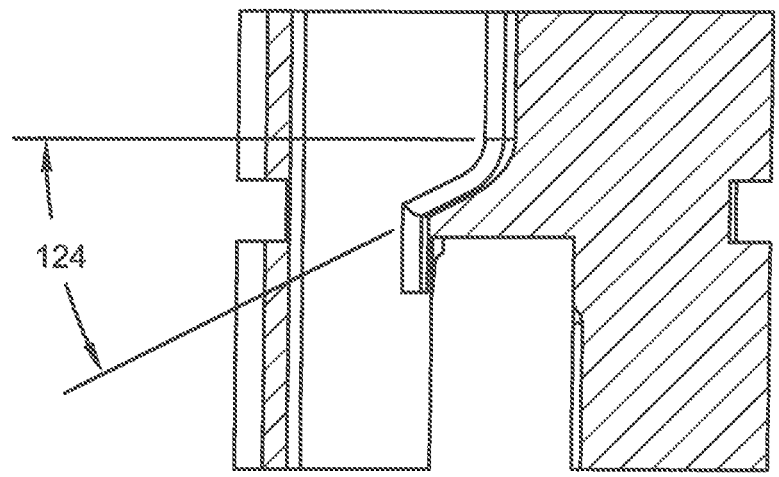
FIG. 5 is a section view of the embodiment of FIG. 1 of a tip dresser blade blank.
Figure 6:
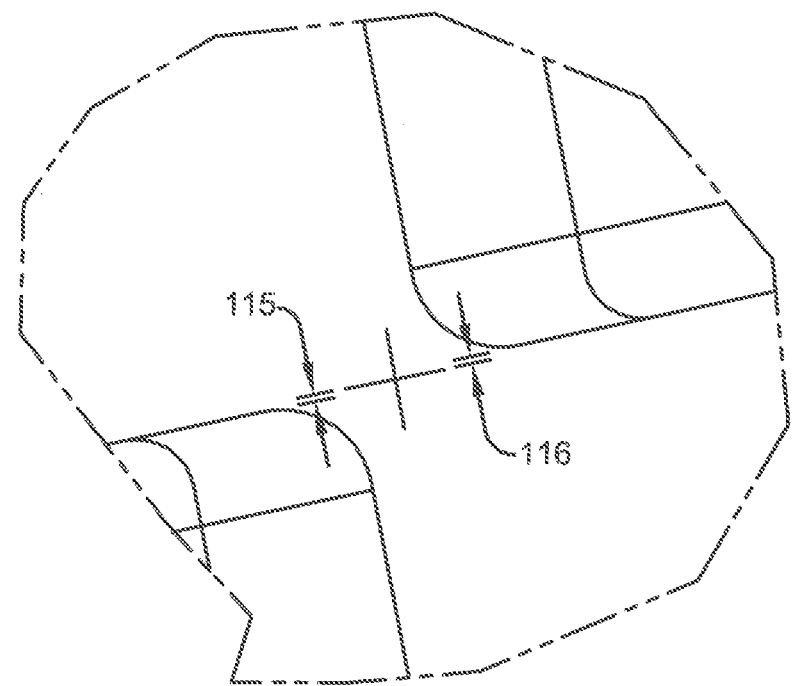
FIG. 6 is a detail view of the embodiment of FIG. 1 of a tip dresser blade blank.
Figure 7:
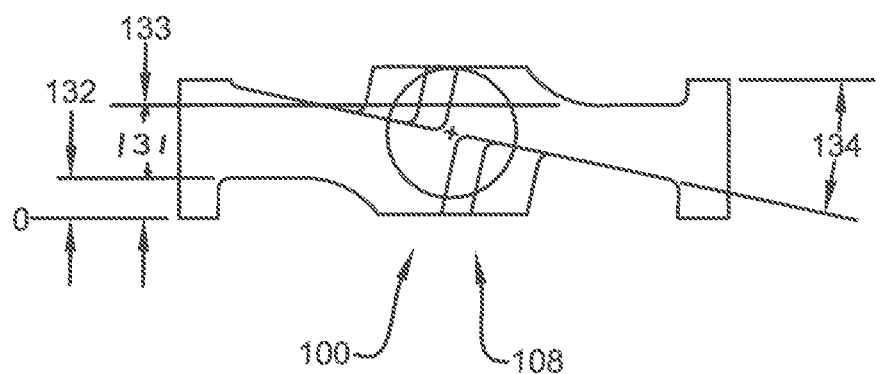
FIG. 7 is a top view of second embodiment of a tip dresser blade blank.
Figure 8:
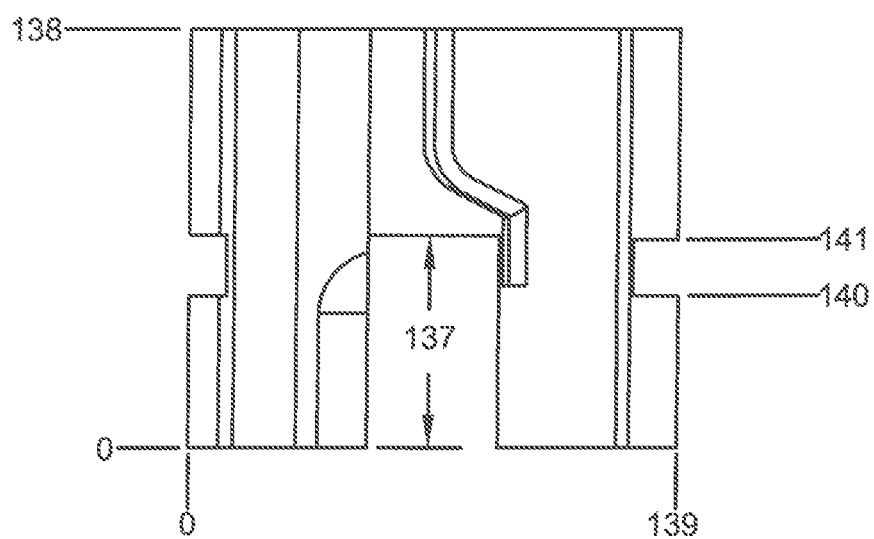
FIG. 8 is a front view of the embodiment of FIG. 7 of a tip dresser blade blank.
Figure 9:
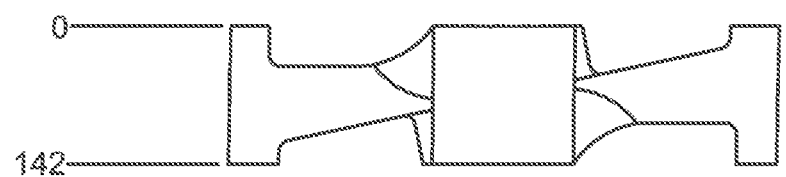
FIG. 9 is a bottom view of the embodiment of FIG. 7 of a tip dresser blade blank.
Figure 10:
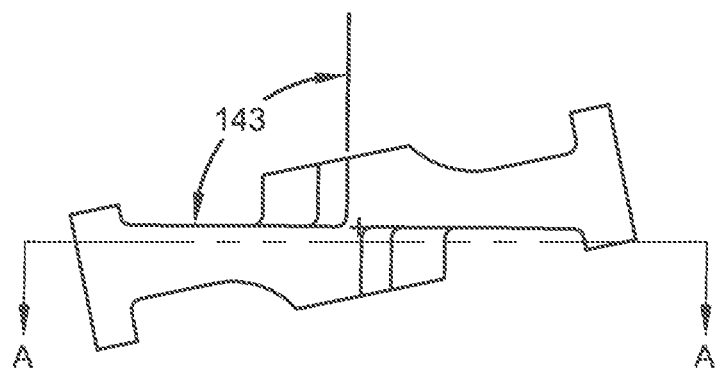
FIG. 10 is a top view of the embodiment of FIG. 7 of a tip dresser blade blank.
Figure 11:
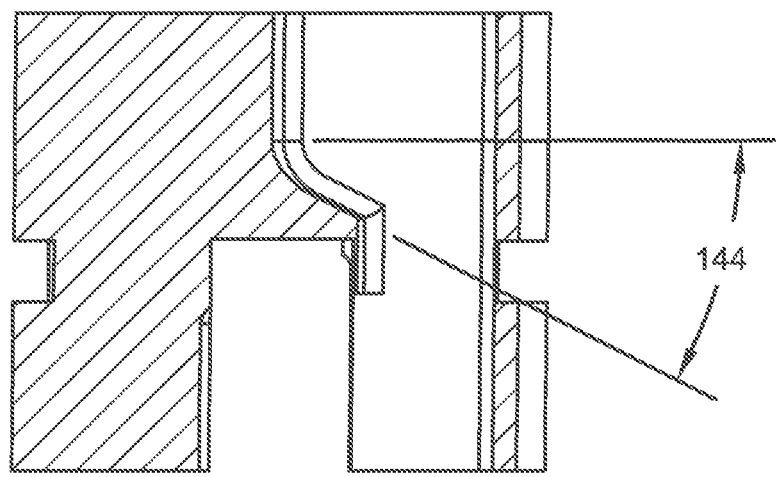
FIG. 11 is a section view of the embodiment of FIG. 7 of a tip dresser blade blank.
Figure 12:
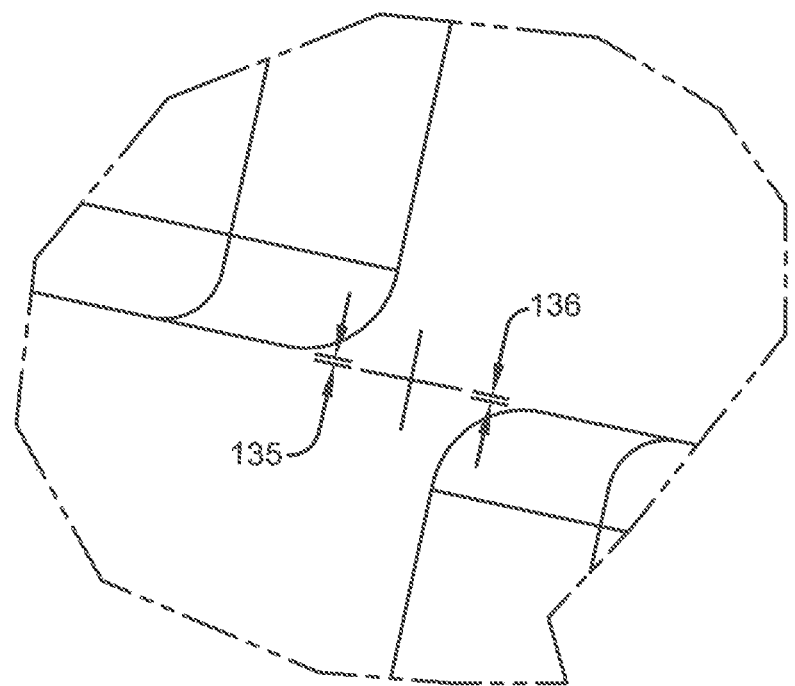
FIG. 12 is a detail view of the embodiment of FIG. 7 of a tip dresser blade blank.

A first non-limiting embodiment of a tip dresser blade blank 106 is shown in FIGS. 1-6. A second non-limiting embodiment of a tip dresser blade blank 108 is shown in FIGS. 7-12. Without limitation, the first tip dresser blade blank 106 and the second tip dresser blade blank 108 may be mirror images of one another differing primarily, but not necessarily solely, in chirality, where the first tip dresser blade blank 106 may be the right-hand version, and the second tip dresser blade blank 108 may be the left-hand version. In all of the FIGS. 1-12, the reference lines and the related dimensions, distances, and angles, are shown relative to a zero line or offset from a reference point.

In the tip dresser blade blank 106 shown in FIGS. 1-6, the tip dresser blade blank 106 has a web width 111 in the range of 0.25 mm to 3.00 mm, inclusive; a blade depth 112 in the range of 1.00 mm to 3.00 mm, inclusive; a blade depth 113 in the range of 2.30 mm to 6.30 mm, inclusive; a Profile Angle 114 in the range of 2 degrees to 35 degrees, inclusive; a Cutting Edge 115 in the range of 0.010 mm to 0.035 mm, inclusive; a Cutting Edge 116 in the range of 0.010 mm to 0.035 mm, inclusive; a Slot Height 117 in the range of 8.70 mm to 12.70 mm, inclusive; a Blade Height 118 in the range of 16.50 mm to 26.50 mm, inclusive; a Blade Width 119 in the range of 20.50 mm to 35.50 mm, inclusive; a Notch Height 120 in the range of 5.70 mm to 15.70 mm, inclusive; a Notch Height 121 in the range of 8.50 mm to 18.50 mm, inclusive; a Blade Depth 122 in the range of 4.30 mm to 8.30 mm, inclusive; a Profile Angle 123 in the range of 2 degrees to 115 degrees, inclusive; and a Relief Angle 124 in the range of 2 degrees to 50 degrees, inclusive.

In the second tip dresser blade blank 108 shown in FIGS. 7-12, the tip dresser blade blank has a web width 131 in the range of 0.25 mm to 3.00 mm, inclusive; a blade depth 132 in the range of 1.00 mm to 3.00 mm, inclusive; a blade depth 133 in the range of 2.30 mm to 6.30 mm, inclusive; a Profile Angle 134 in the range of 2 degrees to 35 degrees, inclusive; a Cutting Edge 135 in the range of 0.010 mm to 0.035 mm, inclusive; a Cutting Edge 136 in the range of 0.010 mm to 0.035 mm, inclusive; a Slot Height 137 in the range of 8.70 mm to 12.70 mm, inclusive; a Blade Height 138 in the range of 16.50 mm to 26.50 mm, inclusive; a Blade Width 139 in the range of 20.50 mm to 20.5 mm, inclusive; a Notch Height 140 in the range of 2.90 mm to 12.90 mm, inclusive; a Notch Height 141 in the range of 5.70 mm to 15.70 mm, inclusive; a Blade Depth 142 in the range of 4.30 mm to 8.30 mm, inclusive; a Profile Angle 143 in the range of 2 degrees to 115 degrees, inclusive; and a Relief Angle 144 in the range of 2 degrees to 50 degrees, inclusive.

In operation the tip dresser blade blank 106, 108 may be further ground to provide cutting surface features adapted to mill or otherwise cut away material from an associated electrode during a tip dress operation.

The provided tip dress blade blank 106, 108 is of interest as the material and geometry are adapted to production of finished tip dress blades of exceptional performance and service life relative to the state of the art. The finished tip dress blades made from the present tip dress blade blanks have been found to provide a suitable tip dress in half the time of state of the art tip dress blades. The finished tip dress blades made from the present tip dress blade blanks have been found to have a service life twice that of state of the art tip dress blades.

Further examples consistent with the present subject matter are set out in the following numbered clauses.

Clause 1. A tip dresser blade blank comprising a casting of M2 steel hardened to a Rockwell C hardness in the range of 63 to 66, inclusive, by double tempering; the casting being ground to provide a first geometry having a web width 111 in the range of 0.25 mm to 3.00 mm, inclusive; a blade depth 112 in the range of 1.00 mm to 3.00 mm, inclusive; a blade depth 113 in the range of 2.30 mm to 6.30 mm, inclusive; a Profile Angle 114 in the range of 2 degrees to 35 degrees, inclusive; a Cutting Edge 115 in the range of 0.010 mm to 0.035 mm, inclusive; a Cutting Edge 116 in the range of 0.010 mm to 0.035 mm, inclusive; a Slot Height 117 in the range of 8.70 mm to 12.70 mm, inclusive; a Blade Height 118 in the range of 16.50 mm to 26.50 mm, inclusive; a Blade Width 119 in the range of 20.50 mm to 35.50 mm, inclusive; a Notch Height 120 in the range of 5.70 mm to 15.70 mm, inclusive; a Notch Height 121 in the range of 8.50 mm to 18.50 mm, inclusive; a Blade Depth 122 in the range of 4.30 mm to 8.30 mm, inclusive; a Profile Angle 123 in the range of 2 degrees to 115 degrees, inclusive; and a Relief Angle 124 in the range of 2 degrees to 50 degrees, inclusive; or a second geometry having a web width 131 in the range of 0.25 mm to 3.00 mm, inclusive; a blade depth 132 in the range of 1.00 mm to 3.00 mm, inclusive; a blade depth 133 in the range of 2.30 mm to 6.30 mm, inclusive; a Profile Angle 134 in the range of 2 degrees to 35 degrees, inclusive; a Cutting Edge 135 in the range of 0.010 mm to 0.035 mm, inclusive; a Cutting Edge 136 in the range of 0.010 mm to 0.035 mm, inclusive; a Slot Height 137 in the range of 8.70 mm to 12.70 mm, inclusive; a Blade Height 138 in the range of 16.50 mm to 26.50 mm, inclusive; a Blade Width 139 in the range of 20.50 mm to 20.5 mm, inclusive; a Notch Height 140 in the range of 2.90 mm to 12.90 mm, inclusive; a Notch Height 141 in the range of 5.70 mm to 15.70 mm, inclusive; a Blade Depth 142 in the range of 4.30 mm to 8.30 mm, inclusive; a Profile Angle 143 in the range of 2 degrees to 115 degrees, inclusive; and a Relief Angle 144 in the range of 2 degrees to 50 degrees, inclusive.

Non-limiting embodiments have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

I claim:

1. A tip dresser: blade blank comprising
   a casting of M2 steel hardened to a Rockwell C hardness in the range of 63 to 66, inclusive, by double tempering;
   the casting being ground to provide
   a first geometry having
   an 111 web width in the range of 0.25 mm to 3.00 mm, inclusive;

an 112 blade depth in the range of 1.00 mm to 3.00 mm, inclusive;
an 113 blade depth in the range of 2.30 mm to 6.30 mm, inclusive;
an 114 Profile Angle in the range of 2 degrees to 35 degrees, inclusive;
an 115 Cutting Edge in the range of 0.010 mm to 0.035 mm, inclusive;
an 116 Cutting Edge in the range of 0.010 mm to 0.035 mm, inclusive;
an 117 Slot Height in the range of 8.70 mm to 12.70 mm, inclusive;
an 118 Blade Height in the range of 16.50 mm to 26.50 mm, inclusive;
an 119 Blade Width in the range of 20.50 mm to 35.50 mm, inclusive;
an 120 Notch Height in the range of 5.70 mm to 15.70 mm, inclusive;
an 121 Notch Height in the range of 8.50 mm to 18.50 mm, inclusive;
an 122 Blade Depth in the range of 4.30 mm to 8.30 mm, inclusive;
an 123 Profile Angle in the range of 2 degrees to 115 degrees, inclusive; and
an 124 Relief Angle in the range of 2 degrees to 50 degrees, inclusive; OR
a second geometry having
an 131 web width in the range of 0.25 mm to 3.00 mm, inclusive;
an 132 blade depth in the range of 1.00 mm to 3.00 mm, inclusive;
an 133 blade depth in the range of 2.30 mm to 6.30 mm, inclusive;
an 134 Profile Angle in the range of 2 degree to 35 degrees, inclusive;
an 135 Cutting Edge in the range of 0.010 mm to 0.035 mm, inclusive;
an 136 Cutting Edge in the range of 0.010 mm to 0.035 mm, inclusive;
an 137 Slot Height in the range of 8.70 mm to 12.70 mm, inclusive;
an 138 Blade Height in the range of 16.50 mm to 26.50 mm, inclusive;
an 139 Blade Width in the range of 20.50 mm to 20.5 mm, inclusive;
an 140 Notch Height in the range of 2.90 mm to 12.90 mm, inclusive;
an 141 Notch Height in the range of 5.70 mm to 15.70 mm, inclusive;
an 142 Blade Depth in the range of 4.30 mm to 8.30 mm, inclusive;
an 143 Profile Angle in the range of 2 degrees to 115 degrees, inclusive; and
an 144 Relief Angle in the range of 2 degrees to 50 degrees, inclusive.

2. A tip dresser blade blank comprising:
a casting, wherein the casting is ground to provide
a geometry having
a web width in the range of 0.25 mm to 3.00 mm, inclusive;
a first blade depth in the range 1.00 mm to 3.00 mm, inclusive;
a second blade depth in the range of 2.30 mm to 6.30 mm, inclusive;
a first Profile Angle in the range of 2 degrees to 35 degrees, inclusive;
a first Cutting Edge in the range of 0.010 mm to 0.035 mm, inclusive;
a second Cutting Edge in the range of 0.010 mm to 0.035 mm, inclusive;
a Slot Height in the range of 8.70 mm to 12.70 mm, inclusive;
a Blade Height in the range of 16.50 mm to 26.50 mm, inclusive;
a Blade Width in the range of 20.50 mm to 35.50 mm, inclusive;
a first Notch Height in the range of 2.90 mm to 15.70 mm, inclusive;
a second Notch Height in the range of 5.70 mm to 18.50 mm, inclusive;
a Blade Depth in the range of 4.30 mm to 8.30 mm, inclusive;
a second Profile Angle in the range of 2 degrees to 115 degrees, inclusive; and
a Relief Angle in the range of 2 degrees to 50 degrees, inclusive.

3. The tip dresser blank of claim 2, wherein the first Notch Height is in the range of 5.70 mm to 15.70 mm, inclusive.

4. The tip dresser blank of claim 2, wherein the first Notch Height is in the range 2.90 mm to 12.90 mm, inclusive.

5. The tip dresser blank of claim 2, wherein the first Profile Angle is in the range of 5 degrees to 30 degrees, inclusive.

6. The tip dresser blank of claim 5, wherein the first Profile Angle is in the range of 10 degrees to 25 degrees, inclusive.

7. The tip dresser blank of claim 6, wherein the first Profile Angle is in the range of 15 degrees to 20 degrees, inclusive.

8. The tip dresser blank of claim 7, wherein the Relief Angle is in the range of 5 degrees to 30 degrees.

9. The tip dresser blank of claim 8, wherein the Relief Angle is in the range of 10 degrees to 25 degrees, inclusive.

10. The tip dresser blank of claim 9, wherein the Relief Angle is in the range of 15 degrees to 20 degrees inclusive.

11. The tip dresser blank of claim 10, wherein the second Profile Angle is in the range of 5 degrees to 115 degrees, inclusive.

12. The tip dresser blank of claim 11, wherein the second Profile Angle is in the range of 10 degrees to 110 degrees inclusive.

13. The tip dresser blank of claim 12, wherein the second Profile Angle is in the range of 20 degrees 100 degrees, inclusive.

14. The dresser blank of claim 13, wherein the second Profile Angle is in the range of 30 degrees to 90 degrees, inclusive.

15. The tip dresser blank of claim 14, wherein the second Profile Angle is in the range of 40 degrees to 80 degrees, inclusive.

16. The tip dresser blank of claim 15, wherein the second Profile Angle is in the range of 50 degrees to 70 degrees, inclusive.

17. The tip dresser blank of claim 16, wherein the casting is M2 hardened steel hardened to a Rockwell C hardness in the range of 63 to 66, inclusive, by double tampering.

* * * * *